United States Patent [19]

Spanke

[11] Patent Number: 5,287,347
[45] Date of Patent: Feb. 15, 1994

[54] ARRANGEMENT FOR BOUNDING JITTER IN A PRIORITY-BASED SWITCHING SYSTEM

[75] Inventor: Ronald A. Spanke, Wheaton, Ill.

[73] Assignee: AT&T Bell Laboratories, Murray Hill, N.J.

[21] Appl. No.: 897,200

[22] Filed: Jun. 11, 1992

[51] Int. Cl.$^5$ ............................................. H04L 12/54
[52] U.S. Cl. ....................................... 370/60; 370/79; 370/85.6
[58] Field of Search ................... 370/17, 60.1, 79, 84, 370/60, 85.6, 94.1, 94.2, 105.3; 375/118

[56] References Cited

U.S. PATENT DOCUMENTS

| | | | |
|---|---|---|---|
| 3,428,946 | 2/1969 | Batcher | 340/146.2 |
| 4,516,238 | 5/1985 | Huang et al. | 370/60 |
| 4,912,702 | 3/1990 | Verbiest | 370/84 |
| 5,016,248 | 5/1991 | Kudoh | 370/94.1 |
| 5,040,171 | 8/1991 | Osaki | 370/17 |
| 5,083,269 | 1/1992 | Syobatake et al. | 395/425 |
| 5,121,383 | 6/1992 | Golestani | 370/60 |
| 5,132,966 | 7/1992 | Hayano et al. | 370/79 |
| 5,150,358 | 9/1992 | Punj et al. | 370/84 |
| 5,179,549 | 1/1993 | Joos et al. | 370/17 |

FOREIGN PATENT DOCUMENTS 9104624  4/1991  World Int. Prop. O. ... H04L 12/56

OTHER PUBLICATIONS

H. Kuwahara et al., "A Shared Buffer Memory Switch for an ATM Exchange", *IEEE Int'l. Conf. on Comms.*, vol. 1 (Jun. 11-14, 1989), pp. 4.4.1-4.4.5.

*Primary Examiner*—Benedict V. Safourek
*Assistant Examiner*—Russell W. Blum
*Attorney, Agent, or Firm*—Ross T. Watland

[57] ABSTRACT

An arrangement where a switching system receives parameter(s) concerning the traffic expected on a call from a first user to a second user, the system determines a priority for the call based on the expected traffic parameter(s), and information is transmitted to the second user during the call based on the determined priority and with less than a maximum jitter. The priority is selected from a predefined priority table based on expected traffic parameters. The priority table is usable for both constant bit rate and statistical calls.

14 Claims, 4 Drawing Sheets

CALL SETUP CELL = 53 BYTES LONG (ATM)

SETUP RESPONSE CELL

ARRANGEMENT FOR BOUNDING JITTER IN A PRIORITY-BASED SWITCHING SYSTEM

TECHNICAL FIELD

This invention relates to communications systems.

BACKGROUND OF THE INVENTION

The term broadband covers a host of new products, technologies, services, and networks. One way to define broadband networks is to categorize them as those networks that support services requiring bit rates well above one megabit per second. Business and residential subscribers will be connected to broadband networks via a common access, operating at 150 megabits per second or above, that can handle a range of different broadband service types. ATM (asynchronous transfer mode) has been chosen as the communication principle on which broadband networks will be based. A future broadband ISDN (integrated services digital network) will offer the flexibility needed to handle diverse services ranging from basic telephone service to high speed data transfer, videotelephony, and high quality television distribution. The key to this flexibility is ATM which carries digital information in special cells. This allows the network to be used efficiently by applications and services with widely differing bandwidth requirements and call characteristics.

Priority-based systems have been designed for switching ATM cells or performing other packet switching functions. In such systems, all cells (packets) for a given priority are transmitted to their destination before the first cell of the next lower priority. Within a given priority, cells are transmitted on a first come-first serve basis. All equal priority cells arriving at a given cell time are transmitted before the same priority cells arriving at the next cell time are started. This becomes the root cause of jitter because one high bandwidth call could have a cell arriving every other cell time; all of a sudden, ten or twenty cells from other calls and having the same priority as the one high bandwidth call arrive in one of the open cell times. All ten or twenty of these cells will be transmitted before the next cell of the high bandwidth call causing an absolute jitter of ten or twenty cell times. During this interval, cells for the high bandwidth call keep arriving every other cell time and are queued up. When the high bandwidth call does begin transmitting its cells again, they will be transmitted every cell time, back-to-back, until the queue is empty. Not only is such jitter unacceptable in many applications, substantial resources are required for buffering and receiver buildout delay.

In addition to being important in constant bit rate applications, jitter is also an important parameter for statistical (bursty) traffic. Variable bit rate video requires very low delay, has very high bandwidth and relatively low burstiness. Variable bit rate voice also requires moderately low delay, has relatively low bandwidth and low burstiness. Both of these applications must have relatively low jitter to guarantee that cells do not arrive "too late" and the buffer at the receiving end does not become empty. Even though this is statistical traffic, it is jitter sensitive.

Other applications, including file transfers and screen image dumps, do not typically require low delay. Such applications can have either low or high average bandwidth; however, they are very bursty. Such applications could significantly interrupt the delay sensitive applications resulting in excessive queuing delays and very large buffer buildouts on the receiving end.

In view of the foregoing, a recognized need in the art exists for an arrangement usable in ATM or other packet switching systems which will bound jitter to an acceptable amount and which is applicable to both constant bit rate and statistical traffic.

SOLUTION

This need is met and a technical advance is achieved in accordance with the invention in an exemplary arrangement where a switching system receives parameter(s) concerning the traffic expected on a call from a first user to a second user, the system advantageously determines a priority for the call based on the expected traffic parameter(s), and information is transmitted to the second user during the call based on the determined priority and with less than a maximum jitter. The priority is selected from a predefined priority table based on the expected traffic parameters. Significantly, the same priority table is usable for both constant bit rate and statistical calls.

A method in accordance with the invention is usable in a switching system serving a number of users. The system receives one or more parameters concerning the traffic expected on a call from a first user to a second user. The system transmits information to the second user during the call based on the expected traffic parameters and with a maximum jitter.

In an illustrative method, when the call is a constant bit rate call, the expected traffic parameters include a bandwidth parameter, BW, and the priority is determined based on BW. The priority is selected from a priority table having a number, P, of priority bands and having a maximum bandwidth, $BW_{High}$, and a minimum bandwidth, $BW_{Low}$, specified for each band. The ratio $BW_{High}/BW_{Low}$ is a constant. The priority is selected by determining the band that includes BW. The maximum jitter is a worst case relative jitter. The constant bit rate call is made up of fixed length cells and the worst case relative jitter, in intercell arrival periods, is given by the constant ratio, $BW_{High}/BW_{Low}$. (The terms "relative jitter" and "intercell arrival period" are described later herein.) If the priority table is used for constant bit rate calls only, it may include one additional priority band below the P priority bands and P and $BW_{High}/BW_{Low}$ satisfy a relationship $[BW_{High}/BW_{Low}]^P = BW_{IF}/BW_{Min}$, where $BW_{IF}$ and $BW_{Min}$ are the maximum and minimum bandwidths between each of the users and the switching system.

In a further illustrative method, the priority table is used for both constant bit rate calls and statistical calls. When the call is a statistical call, the expected traffic parameters include an average bandwidth parameter, $BW_{Avg}$, and a burstiness index, BI, and the priority is determined by determining the band in the priority table that includes the ratio $BW_{Avg}/BI$. The statistical call is made up of fixed length cells and the worst case relative jitter, in intercell arrival periods, is given by the product of BI and the constant ratio, $BW_{High}/BW_{Low}$. P and $BW_{High}/BW_{Low}$ satisfy a relationship $[BW_{High}/BW_{Low}]^P = BW_{IF}*BI_{Max}/BW_{Min}$, where $BW_{IF}$ and $BW_{Min}$ are the maximum and minimum bandwidths and $BI_{Max}$ is the maximum burstiness between each of the users and the switching system.

In both illustrative methods, cells received from the first user during the call are dropped when the cells cause the expected traffic parameters to be exceeded.

DRAWING DESCRIPTION

DETAILED DESCRIPTION

Switching System 100

Figure 1:
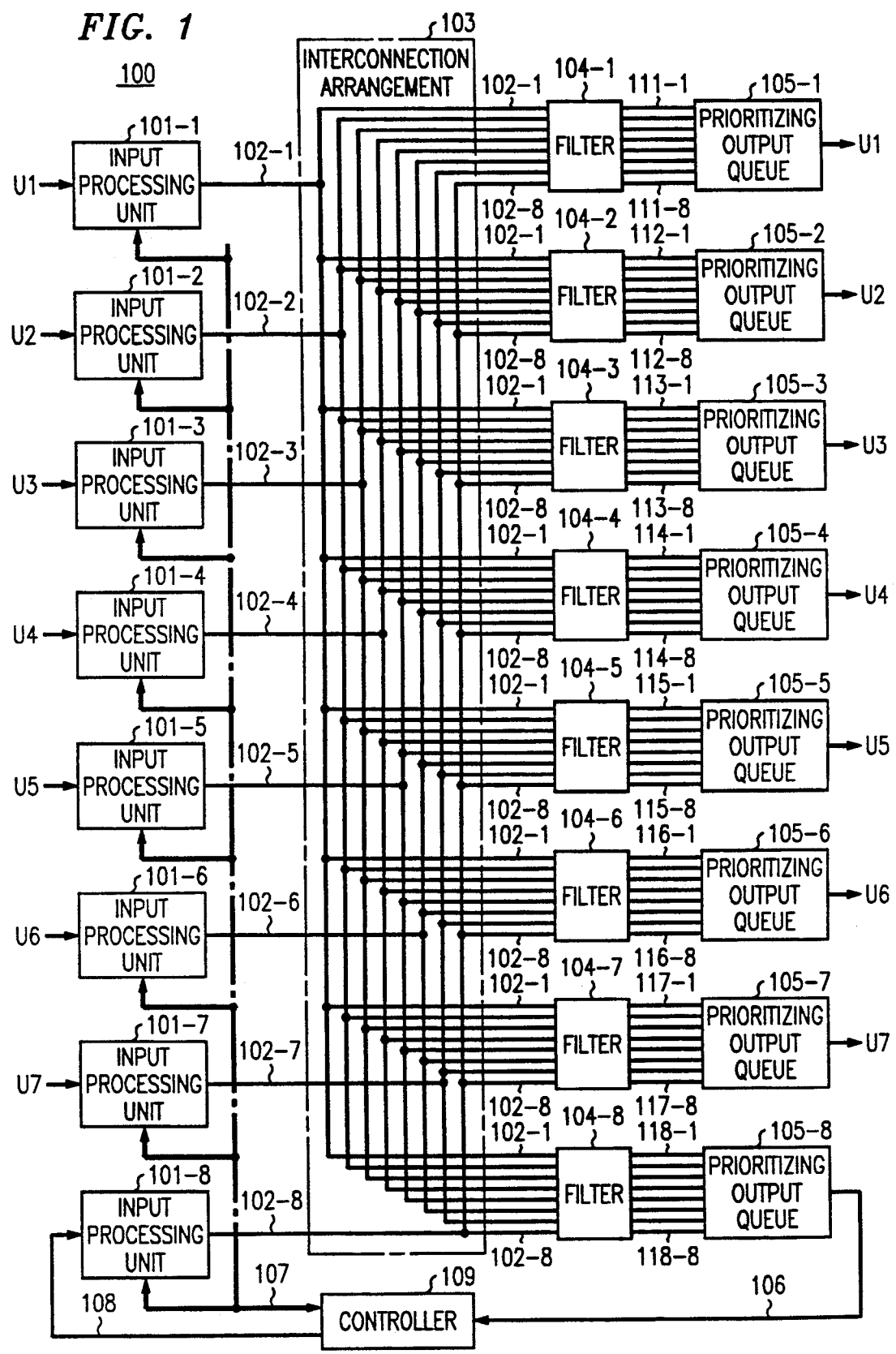
FIG. 1 is a diagram of an exemplary priority-based switching system which includes an arrangement for bounding jitter.

FIG. 1 is a diagram of an exemplary priority-based switching system 100 which includes an arrangement for bounding jitter in accordance with the present invention. The switching function is performed within system 100 by filters 104-1 through 104-8 and prioritizing output queues 105-1 through 105-8. System 100 serves seven users U1 through U7. Input processing units 101-1 through 101-8 process cells from users U1 through U7 as well as cells from a controller 109 which controls the operation of system 100. The processing performed by processing units 101-1 through 101-8 is described further herein. Controller 109 communicates with users U1 through U7 by transmitting cells via path 108 to processing unit 101-8 and on through system 100 to the desired destination user. One of the functions of controller 109 is to determine a priority value for each virtual circuit set up between users based on parameters received from the users concerning the expected traffic. Such priority values are communicated from controller 109 to processing units 101-1 through 101-8 via a path 107 and are inserted in each cell of a virtual circuit for transmission within system 100. Cells from all of the input processing units 101-1 through 101-8 are distributed to each of the eight filters 104-1 through 104-8 via paths 102-1 through 102-8 of an interconnection arrangement 103. Each of the filters 104-1 through 104-8 only transmits cells having a specific destination. For example, filter 104-1 only transmits cells having the user U1 as a destination. Since it is possible that as many as eight cells are received at the same cell time destined for U1, there are eight paths 111-1 through 111-8 between filter 104-1 and queue 105-1. Filter 104-8 only transmits cells having controller 109 as a destination. There are eight paths 118-1 through 118-8 between filter 104-8 and queue 105-8. Queues 105-1 through 105-8 each transmit cells in priority order as described further herein.

Figure 2:
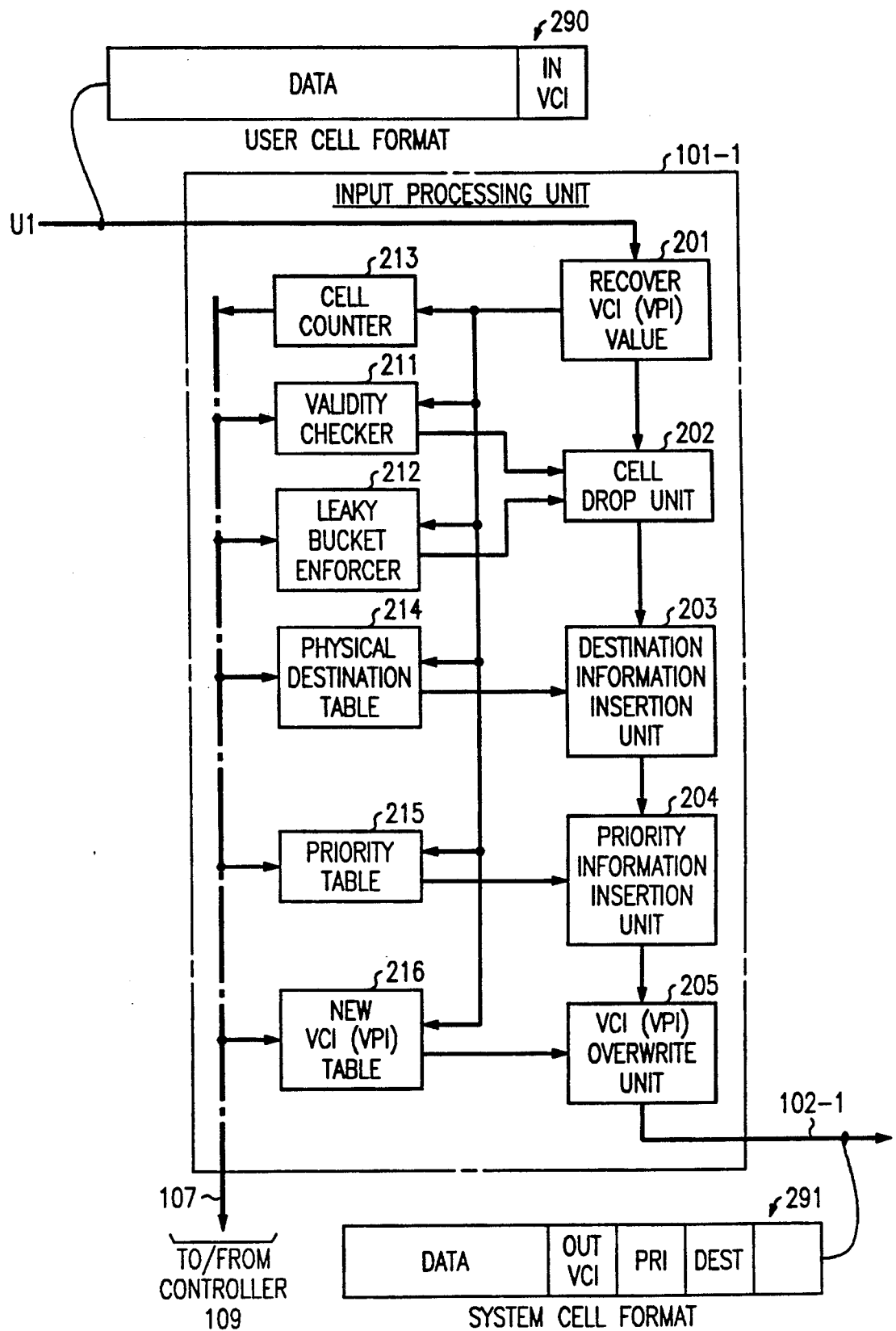
FIG. 2 is a diagram of an input processing unit included in the system of FIG. 1.

Cells are received from user U1 in format 290 shown in FIG. 2. Format 290(FIG. 2) includes an incoming virtual circuit identifier (VCI) or virtual path identifier (VPI) followed by data. A VPI comprises several VCIs. In ATM, cells are 53 bytes in length. Within input processing unit 101-1(FIG. 2), a cell is received by a unit 201, the VCI(VPI) is recovered and transmitted to validity checker 211, leaky bucket enforcer 212, cell counter 213, physical destination table 214, priority table 215 and new VCI(VPI) table 216. Validity checker 211 determines whether the VCI(VPI) is valid based on information received from controller 109 via path 107; if the VCI(VPI) is not valid, it causes a cell drop unit 202 to drop the cell. Leaky bucket enforcer 212 receives expected traffic parameters, for example, expected bandwidth and expected burstiness index, and when enforcer 212 determines that a cell of a given virtual circuit results in the parameters being exceeded, it causes cell drop unit 202 to drop the cell. A cell counter 213 simply counts cells in each virtual circuit, and reports such counts to controller 109. A physical destination table 214 receives information from controller 109 defining the destination associated with each virtual circuit, and, based on the VCI(VPI), causes a destination information insertion unit 203 to insert the destination information in each cell. A priority table 215 receives a priority value from controller 109, and based on the VCI(VPI), causes a priority information insertion unit 204 to insert the priority information in each cell. A new VCI(VPI) table 216 receives a new VCI(VPI) value and causes a VCI(VPI) overwrite unit 205 to overwrite the incoming VCI field of the user cell format 290 with an outgoing VCI in the system cell format 291. Format 291 also includes a destination field as well as a priority field.

Figure 3:
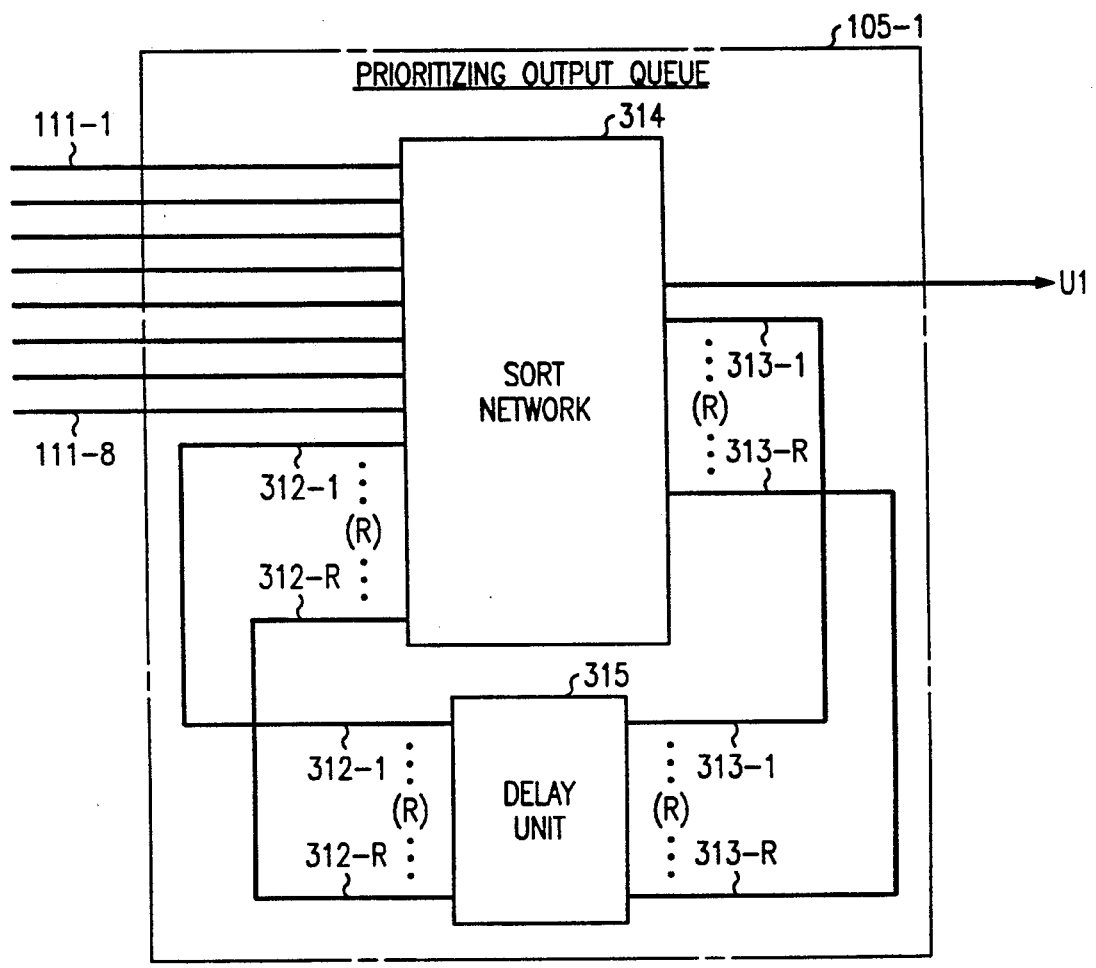
FIG. 3 is a diagram of a prioritizing output queue included in the system of FIG. 1.

Cells transmitted by input processing unit 101-1 (FIG. 1) are distributed via path 102-1 of interconnection arrangement 103 to all of the filters 104-1 through 104-8. Cells destined for user U1 are transmitted by filter 104-1 via paths 111-1 through 111-8 to prioritizing output queue 105-1. Queue 105-1 (FIG. 3) includes a sort network 314 which can be constructed in the manner described, for example, by Batcher in U.S. Pat. No. 3,428,946 issued Feb. 18, 1969, or as described by Huang et al., in U.S. Pat. No. 4,516,238 issued May 7, 1985. Sort network 314 sorts received cells in accordance with the priority field, and transmits the highest priority cell to user U1. The remaining cells are transmitted via paths 313-1 through 313-R(R, being a large number, e.g., greater than 1000) to delay unit 315, which provides a one cell time delay, and transmits the delayed cells back to sort network 314 via paths 312-1 through 312-R. By operation of sort network 314, older cells within a given priority are transmitted to user U1 before newer cells.

The manner of operation of queue 105-1 can be better understood by considering the example of Table 1 with four active virtual circuits VCI1 through VCI4 having priorities 1 through 4, respectively.

TABLE 1

| | | | Bounded Jitter Example | | | | | | | | | | | |
|---|---|---|---|---|---|---|---|---|---|---|---|---|---|---|
| | VCI 1 | VCI 2 | VCI 3 | VCI 4 | | | | | | | * = expected/ | | | |
| | 50% | 33% | 5% | 2.5% | Queue Length | | | | | | # = actual | | | |
| | BI = 2 | BI = 3 | BI = 1 | BI = 1 | Pri | Pri | Pri | Pri | Output | Pri | Pri | Pri | Pri |
| Time | Pri 1 | Pri 2 | Pri 3 | Pri 4 | 1 | 2 | 3 | 4 | Priority | 1 | 2 | 3 | 4 |
| 0 | . | . | . | . | 0 | 0 | 0 | 0 | Idle | | | | |
| 1 | 1 | 2 | 3 | 4 | 1 | 1 | 1 | 1 | 1 | *1 | * | * | * |
| 2 | 1 | 2 | . | . | 1 | 2 | 1 | 1 | 1 | 1 | | | |
| 3 | . | 2 | . | . | 0 | 3 | 1 | 1 | 2 | * | 2 | | |
| 4 | . | . | . | . | 0 | 2 | 1 | 1 | 2 | | *2 | | |

TABLE 1-continued

Bounded Jitter Example

| Time | VCI 1 50% BI = 2 Pri 1 | VCI 2 33% BI = 3 Pri 2 | VCI 3 5% BI = 1 Pri 3 | VCI 4 2.5% BI = 1 Pri 4 | Queue Length Pri 1 | Pri 2 | Pri 3 | Pri 4 | Output Priority | * = expected/ # = actual Pri 1 | Pri 2 | Pri 3 | Pri 4 |
|---|---|---|---|---|---|---|---|---|---|---|---|---|---|
| 5 | 1 | . | . | . | 1 | 1 | 1 | 1 | 1 | *1 | | | |
| 6 | 1 | . | . | . | 1 | 1 | 1 | 1 | 1 | 1 | | | |
| 7 | . | . | . | . | 0 | 1 | 1 | 1 | 2 | * | *2 | | |
| 8 | . | . | . | . | 0 | 0 | 1 | 1 | 3 | | | 3 | |
| 9 | 1 | . | . | . | 1 | 0 | 0 | 1 | 1 | *1 | | | |
| 10 | 1 | 2 | . | . | 1 | 1 | 0 | 1 | 1 | 1 | * | | |
| 11 | . | 2 | . | . | 0 | 2 | 0 | 1 | 2 | * | 2 | | |
| 12 | . | 2 | . | . | 0 | 2 | 0 | 1 | 2 | | 2 | | |
| 13 | 1 | . | . | . | 1 | 1 | 0 | 1 | 1 | *1 | * | | |
| 14 | 1 | . | . | . | 1 | 1 | 0 | 1 | 1 | 1 | | | |
| 15 | . | . | . | . | 0 | 1 | 0 | 1 | 2 | * | 2 | | |
| 16 | . | . | . | . | 0 | 0 | 0 | 1 | 4 | | * | | 4 |
| 17 | 1 | . | . | . | 1 | 0 | 0 | 0 | 1 | *1 | | | |
| 18 | 1 | . | . | . | 1 | 0 | 0 | 0 | 1 | 1 | | | |
| 19 | . | 2 | . | . | 0 | 1 | 0 | 0 | 2 | * | *2 | | |
| 20 | . | 2 | . | . | 0 | 1 | 0 | 0 | 2 | | 2 | | |
| 21 | 1 | 2 | 3 | . | 1 | 1 | 1 | 0 | 1 | *1 | * | | |
| 22 | 1 | . | . | . | 1 | 1 | 1 | 0 | 1 | 1 | * | | |
| 23 | . | . | . | . | 0 | 1 | 1 | 0 | 2 | * | 2 | | |
| 24 | . | . | . | . | 0 | 0 | 1 | 0 | 3 | | | 3 | |
| 25 | 1 | . | . | . | 1 | 0 | 0 | 0 | 1 | *1 | * | | |
| 26 | 1 | . | . | . | 1 | 0 | 0 | 0 | 1 | 1 | | | |
| 27 | . | . | . | . | 0 | 0 | 0 | 0 | Idle | * | | | |
| 28 | . | 2 | . | . | 0 | 1 | 0 | 0 | 2 | | *2 | | |
| 29 | 1 | 2 | . | . | 1 | 1 | 0 | 0 | 1 | *1 | | | |
| 30 | 1 | 2 | . | . | 1 | 2 | 0 | 0 | 1 | 1 | | | |
| 31 | . | . | . | . | 0 | 2 | 0 | 0 | 2 | * | *2 | | |
| 32 | . | . | . | . | 0 | 1 | 0 | 0 | 2 | | 2 | | |
| 33 | 1 | . | . | . | 1 | 0 | 0 | 0 | 1 | *1 | | | |
| 34 | 1 | . | . | . | 1 | 0 | 0 | 0 | 1 | 1 | * | | |
| 35 | . | . | . | . | 0 | 0 | 0 | 0 | Idle | * | | | |
| 36 | . | . | . | . | 0 | 0 | 0 | 0 | Idle | | | | |
| 37 | 1 | 2 | . | . | 1 | 1 | 0 | 0 | 1 | *1 | * | | |
| 38 | 1 | 2 | . | . | 1 | 2 | 0 | 0 | 1 | 1 | | | |
| 39 | . | 2 | . | . | 0 | 3 | 0 | 0 | 2 | * | 2 | | |
| 40 | . | . | . | . | 0 | 2 | 0 | 0 | 2 | | *2 | | |
| 41 | 1 | . | 3 | 4 | 1 | 1 | 1 | 1 | 1 | *1 | * | * | |
| 42 | 1 | . | . | . | 1 | 1 | 1 | 1 | 1 | 1 | | | |
| 43 | . | . | . | . | 0 | 1 | 1 | 1 | 2 | * | *2 | | |
| 44 | . | . | . | . | 0 | 0 | 1 | 1 | 3 | | | 3 | |
| 45 | 1 | . | . | . | 1 | 0 | 0 | 1 | 1 | *1 | | | |
| 46 | 1 | 2 | . | . | 1 | 1 | 0 | 1 | 1 | 1 | * | | |
| 47 | . | 2 | . | . | 0 | 2 | 0 | 1 | 2 | * | 2 | | |
| 48 | . | 2 | . | . | 0 | 2 | 0 | 1 | 2 | | 2 | | |
| 49 | 1 | . | . | . | 1 | 1 | 0 | 1 | 1 | *1 | * | | |
| 50 | 1 | . | . | . | 1 | 1 | 0 | 1 | 1 | 1 | | | |
| 51 | . | . | . | . | 0 | 1 | 0 | 1 | 2 | * | 2 | | |
| 52 | . | . | . | . | 0 | 0 | 0 | 1 | 4 | | * | | 4 |
| 53 | 1 | . | . | . | 1 | 0 | 0 | 0 | 1 | *1 | | | |
| 54 | 1 | . | . | . | 1 | 0 | 0 | 0 | 1 | 1 | | | |
| 55 | . | 2 | . | . | 0 | 1 | 0 | 0 | 2 | * | *2 | | |
| 56 | . | 2 | . | . | 0 | 1 | 0 | 0 | 2 | | 2 | | |
| 57 | 1 | 2 | . | . | 1 | 1 | 0 | 0 | 1 | *1 | | | |
| 58 | 1 | . | . | . | 1 | 1 | 0 | 0 | 1 | 1 | * | | |
| 59 | . | . | . | . | 0 | 1 | 0 | 0 | 2 | * | 2 | | |
| 60 | . | . | . | . | 0 | 0 | 0 | 0 | Idle | | | | |

Note that virtual circuits VC1, VC2, VC3, and VC4 have occupancies of 50%, 33%, 5%, and 2.5%, respectively, and the expected cell arrivals (assuming constant bit rate traffic) corresponding to those occupancies are shown by asterisks on the right in Table 1. Virtual circuits VC1, VC2, VC3, and VC4 have burstiness indices of 2, 3, 1, 1, respectively (burstiness index is discussed later herein). Note that at cell time 1, cells are received in virtual circuits 1, 2, 3, and 4, priorities 1, 2, 3, and 4 have 1 cell each, the output priority is 1, and the cell transmitted is in virtual circuit VC1. At cell time 2, cells are received in virtual circuits 1 and 2, priorities 1, 2, 3, and 4 have 1, 2, 1, and 1 cells, respectively, the output priority is again 1, and the cell transmitted is again in virtual circuit VC1. At cell time 3, a cell is received in virtual circuit 2, priorities 1, 2, 3, and 4 have 0, 3, 1, and 1 cells, respectively, the output priority is 2, and the cell transmitted is in virtual circuit VC2. Note that all cells are transmitted within (2 times BI) expected intercell arrival periods from the expected arrival times. The maximum jitter in this example is (2 times BI) expected intercell arrival periods.

Figures 4, 5:
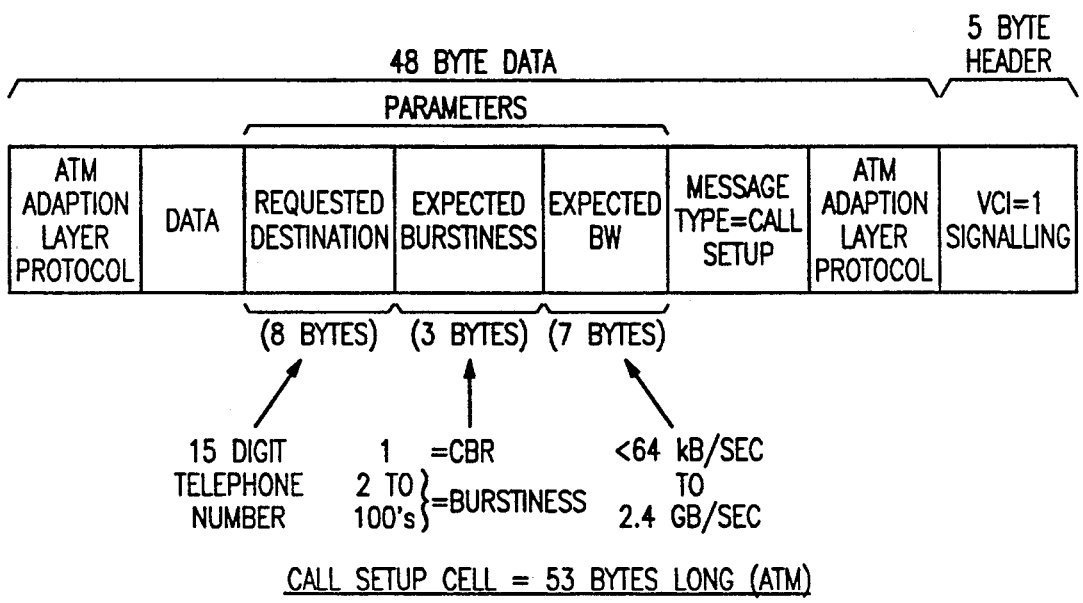
FIG. 4 is a diagram of a call setup cell transmitted from users to the system of FIG. 1.
FIG. 5 is a diagram of a setup response cell transmitted from the system of FIG. 1 to system users.

An illustrative call setup cell received from a user, e.g., user U1, is shown in FIG. 4. The five-byte header defines that VCI=1, which defines the cell as a signalling cell. VCI1 is predefined as a valid VCI in checker 211(FIG. 2), as having controller 109 as the destination in table 214, and having a new VCI in table 216 for insertion in the system cell format. That new VCI also serves as a source identifier. At the beginning and end of the 48-byte data portion of the call setup cell(FIG. 4) are fields enclosing the remaining data in an ATM adaption layer protocol. The data includes a message type defined as call setup, and three parameters—the expected bandwitdth (seven bytes), the expected burstiness (three bytes), and the requested destination telephone number (eight bytes). The call setup cell is conveyed via interconnection arrangement 103, filter 104-8, and queue 105-8 to controller 109. Controller 109 uses the expected bandwidth and expected burstiness to assign a priority to the call by using a table of the type shown herein as Table 4. If the call is a constant bit rate (CBR) call (having BI=1), the priority is determined by placing the expected bandwidth in one of the ranges of the table. If the call is statistical call (having BI>1), the expected bandwidth is an average bandwidth, $BW_{Avg}$, and the priority is determined by placing $BW_{Avg}/BI$ in one of the ranges of the table. Controller 109 also performs a translation on the requested destination telephone number to obtain a physical destination, e.g., user U5, and assigns a VCI for use by user U1 and a VCI for use by user U5 for the call. Controller 109 returns a setup response cell of the type shown in FIG. 5 via path 108, processing unit 101-8, interconnection arrangement 103, filter 104-1, and queue 105-1 to user U1. The setup response cell indicates whether the requested call has been approved, echoes the parameters, and defines the assigned VCI to be used subsequently by user U1 for the call. Controller 109 returns a similar setup response cell to user U5. Controller 109 transmits information via path 107 and input processing unit 101-1 to validity checker 211 (FIG. 2) defining the assigned VCI as valid, to enforcer 212 defining the bandwidth and burstiness parameters for the assigned VCI, to table 214 defining the physical destination associated with the assigned VCI, to table 215 defining the priority associated with the assigned VCI, and to table 216 defining the outgoing VCI to be used for incoming cells having the assigned VCI. If a return interconnection from user U5 to user U1 is also set up, controller 109 uses the bandwidth and burstiness parameters for the return path to calculate the priority for the return path. Controller 109 transmits similar information via path 107 to processing unit 101-5 (FIG. 1) to set up the return path.

Bounding Cell Jitter Using Priority Levels

The following description provides background information on the number of delay priority levels required for an exemplary ATM fabric. It discusses the phenomenon of cell jitter for CBR (constant bit rate) traffic and shows how this maximum cell jitter can be bounded by allocating a priority level to a range of frequencies. Based on these results, the number of priority levels required for CBR traffic is determined. Statistical traffic can also be characterized by jitter. Even though statistical VCs (virtual circuits) can tolerate a higher amount of jitter, this jitter must still be absolutely bounded for many statistical applications to function correctly. Statistical traffic can also be divided into priority levels. A unified priority arrangement is described which overlaps the CBR and statistical priorities such that both CBR and statistical VCs exist in the same priority spectrum. The total number of priority levels required for this combined CBR and statistical traffic is determined to maintain reasonable upper bounds on cell jitter.

Cell Jitter for CBR Traffic

A CBR channel at a given frequency expects a cell to arrive periodically with a given inter-cell spacing. As an example, on a 2.488 Gb/s interface, a 100 Mb/s video call is set up. This call expects to receive a cell every 25 cell times. This 25 cell period is defined as the expected intercell arrival period. Due to contention and queuing in the ATM (asynchronous transfer mode) fabric, the cell may not be output exactly when it is expected. "Absolute Jitter" is defined as the amount that the actual cell arrival time differs from the expected cell arrival time.

A low bandwidth virtual channel with an expected interarrival time of 2000–3000 cell times would not be significantly affected by an absolute jitter of 300–500 cells, whereas a 300–500 cell absolute jitter would be devastating to a high bandwidth virtual channel that expected a cell every 2–3 cell times. A more representative term is the "Relative Jitter". Relative Jitter is defined as follows:

$$\text{Relative Jitter} = \frac{\text{Worst Case Absolute Jitter}}{\text{Expected Intercell Arrival Period}}$$

This worst case relative jitter represents the maximum difference in earliest arrival to latest arrival that can be expected, compared to the expected intercell arrival time. A Relative Jitter of 1 to 2 expected intercell arrival times would be very good. A relative jitter of many intercell arrival periods would be very poor, and would require significant buffering at the receiver to insure that the playback data does not run out.

Many CBR services such as audio or video expect the next cell to arrive at the expected time so they can begin displaying the information. A "just-in-time" cell arrival would minimize the overall delay through the switch. However, because of cell jitter, just-in-time cell arrivals cannot be guaranteed, and the application is forced to queue up several cells on the receiving end to insure that the playback of information does not run out of data while waiting for the next ATM cell to arrive. To the extent that overall jitter in the switch can be reduced, this will also reduce the amount of buffering and receiver buildout delay required for CBR services.

In a priority based fabric, all cells for a given priority will be output before the first cell of the next lower priority. Within a given priority, cells are output on a first come-first serve basis. That is, all equal priority cells arriving at a given cell time will be transmitted before the same priority cells arriving at the next cell time are started. This becomes the root cause of jitter because one VC could have a cell arriving every other cell time; all of a sudden, ten or twenty cells having the same priority as the one VC but from different VCs arrive in one of the open cell times. All ten or twenty of these cells will be transmitted before the next cell of the high bandwidth VC, causing an absolute jitter of ten or twenty cell times. During this interval, cells for the high bandwidth VC keep arriving every other cell time and are queued up. When the high bandwidth VC does begin transmitting its cells again, they will be transmitted every cell time, back-to-back, until the queue is empty.

Calculation of Possible Cell Jitter

An upper bound for the worst case absolute and relative jitter can be determined by a simple technique. One determines the highest bandwidth channel and the lowest bandwidth channel that are allowed within a given priority band. For this technique, the highest BW VC has an upper limit of ½ of the total interface rate. This value will generate the worst case jitter. One computes the expected intercell arrival period for this highest bandwidth channel. One then computes N, the maximum number of the low bandwidth channels that can be active on the interface, along with the one highest bandwidth channel. This is given by the following formula:

$$N = \left\lfloor \frac{BW_{Interface} - BW_{Highest\ Allowed}}{BW_{Lowest\ Allowed}} \right\rfloor$$

The worst case jitter would occur when a cell from all N low bandwidth sources arrived just before a cell from the 1 high bandwidth source. The cell from the high bandwidth VC would have waited its average intercell arrival period, and then just before it was output, N cells from the low bandwidth VCs must be output before the next cell from the high bandwidth VC. The actual interarrival interval between cells from the high bandwidth VC is the expected interarrival period + N cells. The Absolute Jitter is this actual interarrival interval minus the expected interarrival interval, which is always just equal to N cell times. Relative Jitter is then the Absolute Jitter divided by the expected interarrival interval.

Consider the following example. A 150 Mb/s interface has only a single priority level and has no limit on how small a VC bandwidth can be. For this technique, the highest bandwidth VC is limited to ½ of the interface rate or 75 MB/s. This gives an expected intercell arrival time of 2 cells. (i.e. a cell should arrive every other cell time.) Now since there is no limit on the smallest VC bandwidth, assume that this bandwidth is $1/\infty$ bits/sec. (i.e. very, very small). The number of these low bandwidth sources that can be supported on the remaining 75 Mb/s is therefore $\infty$. The worst case jitter would occur when a cell from all $\infty$ VCs was received just before the cell from the high bandwidth VC resulting in an Absolute Jitter equal to N or $\infty$ celltimes. The Relative Jitter is this $\infty$ divided by 2 which is still $\infty$. This unrealistic example is included merely to show that a single priority system with no lower bound on the VC bandwidth will generate up to an $\infty$ amount of relative jitter. Clearly this is to be avoided.

Consider a more realistic example, still with a single priority system, but now a minimum VC bandwidth of 64 Kb/s is set. The maximum bandwidth VC allowed is 75 Mb/s with an intercell arrival interval of 2 cells. The number of low bandwidth sources is N=(150 Mb−75 Mb)/64 Kb=1171. The absolute jitter is N=1171 cell times. The relative jitter is 1171/2=585 interarrival times. Again, a jitter this large is to be clearly avoided.

Consider an example with multiple priorities and having a very restricted band. The highest BW allowed in a given priority band is 10 Mb/s and the lowest BW allowed in that same priority band is 5 Mb/s. The expected intercell arrival time is 15 cell times for the highest BW channel. The number of low BW channels that can be supported is N=(150 Mb−10 Mb)/5 Mb=28.

The worst case absolute jitter is N=28 cell times. The relative jitter is 28/15 or less than 2 interarrival intervals. This represents a very well bounded jitter specification.

All that is necessary to calculate the relative jitter is the ratio between the highest BW channel within the priority band and the lowest priority channel within the priority band. If the actual bandwidth distribution among the priority levels results in different ratios, then the largest ratio should be used. In the previous example, the highest BW to lowest BW ratio is 10 MB/5 MB=2.0, and for a bandwidth ratio of 2 the maximum absolute jitter will be less than 2.0 interarrival times. The previous calculation resulted in a relative jitter of 28/15, which is within this range. Table 2 lists the maximum relative jitter for various ratios of highest bandwidth to lowest bandwidth.

TABLE 2

Upper Bound of Relative Jitter for Given Ratio of $BW_{High}$ to $BW_{Low}$

| Largest $\frac{BW_{High}}{BW_{Low}}$ Ratio | Worst Case Relative Jitter |
|---|---|
| 1.0 | ≦1.0 Interarrival Interval |
| 1.25 | ≦1.25 Interarrival Intervals |
| 1.5 | ≦1.5 Interarrival Intervals |
| 1.75 | ≦1.75 Interarrival Intervals |
| 2 | ≦2.0 Interarrival Intervals |
| 3 | ≦3.0 Interarrival Intervals |
| 4 | ≦4.0 Interarrival Intervals |
| 5 | ≦5.0 Interarrival Intervals |
| 10 | ≦10 Interarrival Intervals |
| 20 | ≦20 Interarrival Intervals |
| 50 | ≦50 Interarrival Intervals |
| 100 | ≦100 Interarrival Intervals |
| 200 | ≦200 Interarrival Intervals |
| 500 | ≦500 Interarrival Intervals |
| 1000 | ≦1000 Interarrival Intervals |
| 2000 | ≦2000 Interarrival Intervals |
| 5000 | ≦5000 Interarrival Intervals |

Number of Priority Levels Required for CBR Traffic

The number of priority levels is determined solely by the bandwidth of the interface, $BW_{IF}$, the minimum bandwidth allowed on the interface, $BW_{Min}$, and the extent that jitter on the switch is to be bounded. The ratio $BW_{IF}/BW_{Min}$ gives the total bandwidth range that must be covered by the various priority bands. As shown earlier, the ratio $BW_{High}/BW_{Low}$ gives the bandwidth range that is covered within one priority band. Since this is a geometric relationship, the number of priorities, P, required can be determined by the simple relationship:

$$\left( \frac{BW_{High}}{BW_{Low}} \right)^P = \frac{BW_{IF}}{BW_{Min}}$$

Given the maximum and minimum bandwidths supported on the link, and the number of priority bands for CBR traffic, the ratio of $BW_{High}/BW_{Low}$ can be computed for a given priority band. Given this ratio, the upper bound for the jitter on the switch is also known. This is shown in Table 3.

TABLE 3
Number of Priorities for CBR and Resulting Jitter

| $BW_{IF}$ | $BW_{Min}$ | Number of CBR Priorities | $\frac{BW_{High}}{BW_{Low}}$ Ratio within 1 Band | Worst Case Relative Jitter |
|---|---|---|---|---|
| 2.488 Gb | 9.6 Kb | 1 | 260,000 | <260,000 Interarrival Periods |
| | | 2 | 509 | ≦509 Interarrival Periods |
| | | 3 | 63.75 | ≦63.75 Interarrival Periods |
| | | 4 | 22.5 | ≦22.5 Interarrival Periods |
| | | 6 | 8.0 | ≦8.0 Interarrival Periods |
| | | 8 | 4.75 | ≦4.75 Interarrival Periods |
| | | 12 | 2.82 | ≦2.82 Interarrival Periods |
| | | 16 | 2.17 | ≦2.17 Interarrival Periods |
| | | 24 | 1.68 | ≦1.68 Interarrival Periods |
| | | 32 | 1.47 | ≦1.47 Interarrival Periods |
| | | 48 | 1.30 | ≦1.30 Interarrival Periods |
| | | 64 | 1.21 | ≦1.21 Interarrival Periods |

In addition to the number of priorities listed in Table 3, one additional priority should be allocated for all CBR traffic below the minimum supported bandwidth. No relative jitter specification can be guaranteed for this lowest priority, as it could potentially approach infinity.

It should be a goal of the ATM switch to bound relative jitter to the smallest possible amount. A practical limit would be to bound the maximum relative jitter to within 2 expected interarrival periods. In this fashion, all CBR applications would only have to use a build out delay at the receiving end of 2 additional cells. Any additional delay is critical, especially in 64 Kb/s or lower voice traffic. This may be a good requirement for the maximum cell jitter allowed. Given this requirement for an exemplary 2,488 Gb/s switch, the recommended number of priorities for CBR traffic would be between 20 and 24 priority levels. If 20 priority levels were used, this would include the additional priority level for all CBR traffic below the lowest BW, for which no jitter specification can be guaranteed.

A practical scale for grouping bandwidths into priority bands to guarantee relative jitter within 2 expected interarrival periods is to set the $BW_{High}/BW_{Low}$ ratio for each priority band exactly equal to 2.0. In this fashion, it is very easy to compute the priority bands as shown in Table 4.

TABLE 4
Proposed Priority Bands for CBR Traffic with $\frac{BW_{High}}{BW_{Low}} = 2.0$

| Priority Band | Bandwidth Range | |
|---|---|---|
| | $BW_{Low}$ | $BW_{High}$ |
| 1 | >1244 Mb/s | ≦2488 Mb/s |
| 2 | >622 Mb/s | ≦1244 Mb/s |
| 3 | >311 Mb/s | ≦622 Mb/s |
| 4 | >155.52 Mb/s | ≦311.04 Mb/s |
| 5 | >77.76 Mb/s | ≦155.52 Mb/s |
| 6 | >38.88 Mb/s | ≦77.76 Mb/s |
| 7 | >19.44 Mb/s | ≦38.88 Mb/s |
| 8 | >9.72 Mb/s | ≦19.44 Mb/s |
| 9 | >4.86 Mb/s | ≦9.72 Mb/s |
| 10 | >2.43 Mb/s | ≦4.86 Mb/s |
| 11 | >1.215 Mb/s | ≦2.43 Mb/s |
| 12 | >607.5 Kb/s | ≦1215 Kb/s |
| 13 | >303.8 Kb/s | ≦607.5 Kb/s |
| 14 | >151.9 Kb/s | ≦303.8 Kb/s |
| 15 | >75.94 Kb/s | ≦151.9 Kb/s |
| 16 | >37.9 Kb/s | ≦75.94 Kb/s |
| 17 | >18.98 Kb/s | ≦37.97 Kb/s |
| 18 | >9.492 Kb/s | ≦18.98 Kb/s |
| 19 | >4.746 Kb/s | ≦9.492 Kb/s |
| 20 | >0 † | ≦4.746 Kb/s |

† Note: No Jitter Spec can be guaranteed for the lowest BW range.

Priority Bands for Statistical Traffic

Relative Jitter is also an important parameter for statistical traffic. In statistical traffic, there are some applications that require very low delay such as variable bit rate video. This application has very high bandwidth and relatively low burstiness (BI=2 to 5). Variable bit rate voice also requires moderately low delay. VBR voice has relatively low bandwidth (8-32 Kb/s) and low burstiness (BI=2 to 5). These must hold a relatively tight relative jitter specification, to guarantee that cells do not arrive "too late" and the delay buildout buffer on the receiving end does not become empty. Even though this is statistical traffic, it is jitter sensitive.

Other applications, including file transfers and screen image dumps, usually do not require low delay. These applications can be either low or high average bandwidth, however they tend to be very, very bursty (BI=1000's). If multiple priorities did not exist within statistical traffic, these very bursty applications would significantly interrupt the delay sensitive applications resulting in excessive queuing delays and very large buffer buildouts on the receiving end to compensate for the delay variations.

The general priority philosophy within statistical traffic is based on both bandwidth and burstiness of the VC. Just as in CBR traffic, to minimize jitter effects, higher priority is given to the higher BW VCs and lower priority is given to the lower BW VCs. However, concerning burstiness, higher priority is given to the low burstiness VCs and lower priority is given to the high burstiness VCs.

TABLE 5
Priority Philosophy for Statistical Traffic

| | | Low Burstiness | High Burstiness |
|---|---|---|---|
| High BW | | Highest Priority (VBR Video) | Medium Priority |
| Low BW | | Medium Priority (VBR Voice) | Lowest Priority (File Transfers) |

High speed and low burstiness applications such as VBR Video receive the highest statistical priority. Medium priority goes to low bandwidth, low burstiness VCs such as VBR voice. Medium priority also goes to high bandwidth, high burstiness VCs. Because of their high average bandwidth, there cannot be many of the VCs simultaneously, therefore their contribution to the total queuing delays are less. Finally lowest priority goes to low bandwidth high burstiness VCs, such as occasional megabyte file transfers, that are not delay sensitive. Not only do they have large burst lengths, their average bandwidth is low. Therefore many of these VCs could be simultaneously equipped on a given interface. The resulting collision of many of these high bursty VCs creates very, very large queuing delays.

The important ratio to use when allocating a priority to a statistical VC is the $BW_{Avg}/BI$ ratio. Large $BW_{Avg}/BI$ ratio VCs will receive the highest priority. Very small $BW_{Avg}/BI$ ratio Vcs will receive the lowest priority. $BW_{Avg}$ represents the long term average bandwidth. Over a shorter interval, these statistical VCs may operate at a much higher peak bandwidth, but that is not important. The long term average bandwidth is the critical factor used in setting up the call and determining jitter bounds.

Intermixing CBR and Statistical Traffic—Unified Priority Spectrum

Consider the following example where one variable bit rate (VBR) video channel operates at an average BW of 30 Mb/s. However, it is slightly bursty; assume that BI=5. Its expected intercell arrival period (if the average BW were evenly spaced on a 2.488 Gb/s interface) is 83 cell times. If it were CBR traffic we would want to hold its Relative Jitter to less than 2 intercell arrival periods. However, since it is bursty traffic anyway, the receiver is designed to have a buildout buffer that can accommodate a larger relative jitter. It cannot, however, tolerate a very large relative jitter, otherwise, the delay buildout buffer would be very large, and the overall delay would grow to unacceptable levels for real-time voice/video applications. Assume that this application can tolerate a relative jitter of up to 5–10 interarrival periods. This turns out to be a reasonable number since the source has BI=5. Because it is bursty, it is expected to tolerate somewhat more jitter.

Since this is a statistical VC, if the highest priority were allocated just below the CBR traffic, an interesting phenomenon could result. The 4.7 Kb/s to 9.5 Kb/s CBR band would have higher priority than this 30 MB/s, BI=5 traffic. One can compute the worst case jitter by allocating the rest of the 2.488 Gb/s interface (2.458 Gb/s remaining) to the lowest BW CBR call in that priority level (4.7 Kb/s). This means that potentially 522,978 CBR VCs at 4.7 Kb/s can exist simultaneously with the 30 Mb/s VBR video channel. The worst case absolute jitter would be 522,978 cell times. The worst case relative jitter would be 522,978/83=6300 intercell arrival periods. Even though this is a statistical VC, there is no way that the VBR video application can handle a relative jitter in this range.

Certain statistical VCs must have higher priority than some CBR VCs. In other words, the CBR and statistical priorities must be intermixed. CBR traffic should not automatically have higher priority than statistical traffic.

If we intermix CBR traffic and statistical traffic on the same priority scale, two important constraints must be observed:

1. The relative jitter for any CBR VC must still be able to be kept to $\leq 2$ intercell arrival periods.
2. The relative jitter for any statistical VC must be kept to within a reasonable number of intercell arrival periods. This number should be bounded to a finite value, so that customer application equipment can be built accordingly.

Low burstiness VCs, such as VBR video and VBR voice must be bounded to within a very low number of intercell arrival periods. Higher burstiness VCs, such as file transfers, can be bounded to a much higher number of intercell arrival periods. A relative jitter bound is still important for these VCs, because it defines the amount of memory that is required on the receiving side to receive a file.

It is proposed here that a reasonable bound for relative jitter that appears to meet all statistical applications is to set the maximum bound on the relative jitter to be proportional to the bursitness index of the traffic. The specific method outlined below with $BW_{High}/BW_{Low}=2.0$ in each priority band will limit the relative jitter to 2*BI for a statistical VC with a given Burstiness Index, although tighter bounds can be obtained by increasing the number of priority levels. A CBR VC (BI=1.0) would have its relative jitter bounded to within 2 intercell arrival times. A low bursty statistical VC (BI=2 to 5) would have its relative jitter bounded to within 4 to 10 intercell arrival times respectively. This will then work for VBR video or VBR voice traffic. A more bursty VC (VC=50) would have its relative jitter bounded to within 100 intercell arrival times. Finally a highly bursty VC (BI=1000) would have its relative jitter bounded to within 2000 intercell arrival times.

In this fashion, the average BW and the burstiness will be specified for an application. The switch will police the input to guarantee that these values are not exceeded. The application will automatically know the maximum buildout buffer that it must allow on its receiver to guarantee that it will not run out of cells. CBR is now just a special case of statistical traffic, with BI=1.0.

The following scheme is usable for sharing the same priority levels between CBR and statistical traffic:

1. When a CBR call is set up, its BW is added to the total of BW of all VCs on the interface. This total BW of all VCs on the interface cannot be overallocated.
2. When a statistical call is set up, its long term Average BW is added to the total of BW of all VCs on the interface. This total BW of all VCs on the interface cannot be overallocated.
3. When a CBR call is set up, it is given the priority level corresponding to its bandwidth. Higher BW calls receive higher priority. Lower BW calls receive lower priority.
4. When a statistical call is set up, it is given the priority level corresponding to its $BW_{Avg}/BI$ factor. A statistical VC will be allocated the same priority as a CBR call of 1/BI times its bandwidth.
5. If $BW_{High}/BW_{Low}=2.0$ in each priority band, a CBR call will have its relative jitter bounded to within 2 intercell arrival periods.
6. On this same priority scale, a statistical call will have its relative jitter bounded to within 2*BI intercell arrival periods.

Unified Priority Spectrum—Examples

Certain CBR traffic will have lower priority than some statistical calls. With the above scheme, it is still possible to guarantee a relative jitter of less than 2 intercell arrival times for these CBR VCs, even though there is statistical traffic with higher priority above it.

An example is in order. Consider one 64 Kb/s voice call. It is a CBR call with an expected intercell arrival time on the 2.488 Gb/s interface of 38875 cells. A relative jitter of 2 intercell arrival times must be maintained. Consider a large number (248) of bursty LANs with an average BW of 10 MB/s. (Note that the peak BWs will be higher.) Assume each LAN has a maximum burstiness of BI=100. The 248 10 MB/s (average BW) and the single 64 Kb/s CBR voice call will all fit on the same 2,488 Gb/s interface (99.7% occupancy). Each 10 Mb/s LAN VC is allocated a priority corresponding to $$\frac{10 \text{ Mb/s (average)}}{BI = 100}$$

or 100 Kb/s. Based on Table 4 this receives priority 15. The 64 Kb/s CBR call receives priority 16. Note that all of the highly bursty LAN VCs receive a higher priority than the signle 64 Kb/s voice call.

The CBR voice call still maintains its relative jitter to within 2 intercell arrival periods. The worst case example is if right before a cell for the 64 Kb/s VC was received, all 248 LANs received a burst of 100 cells before the next cell for the 64 Kb VC arrived. To make matters worse, since they are 10 Mb/s average channels, each channel should have received an average of 156 cells (worst case is 2 bursts of 100 cells) between consecutive cells for the 64 Kb/s call. They could not have received more than this because the input policing would have limited the VCs to a BI=100, and worst case two bursts within this time period. Since all of the LAN cells are a higher priority than the 64 KB/s VC, they will be output first, resulting in a worst case absolute jitter of 248*2*100=49600 cell times. The relative jitter is only 49600/38875=1.276 interarrival periods. The upper bound for relative jitter for CBR traffic has been maintained within 2 intercell arrival periods even though there is significant statistical traffic with a higher priority.

A second example is in order to illustrate that the relative jitter for statistical calls can be maintained to 2*BI intercell arrival times. Assume 1 VBR video call at 3 Mb/s average bandwidth with a BI=5. This has an expected intercell arrival period (assuming evenly spaced cells) of 829 cell times on a 2.488 Gb/s interface. This is allocated a priority corresponding to $$\frac{BW_{Avg} = 3 \text{ Mb/s}}{BI = 5} = 600 \text{ Kb/s.}$$

From Table 4, this results in a priority value of 13. 600 Kb/s is close to the highest BW allowed in this priority level. To compute the worst case jitter, assume that the remaining bandwidth (2.488 Gb/s−3 Mb/s=2.485 Gb/s) is made up of calls with the lowest BW allowed in this same priority class (303.75 Kb/s). This results in N=8182 VCs at 303.75 Kb/s. If all 8182 VCs arrived just before the cells of the 3 Mb/s VBR call, the worst case absolute jitter would be 8182 cell times. The relative jitter is 8182/829=9.87 intercell arrival periods. This is within the upper bound of 10 intercell arrival periods that was expected for a BI=5 VC. In this example, the receiver for the VBR video call can implement a minimal buildout buffer of 9 cells and guarantee that jitter will always fall within this amount. The buildout buffer will never become empty, and it will impose the minimum excess delay on the video call.

Number of Unified Priority Levels for CBR and Statistical Traffic

The total number of priority levels required for the fabric is determined solely by the following four criteria:

1. The bandwidth of the Interface, $BW_{IF}$.
2. The minimum bandwidth allowed on the interface, $BW_{Min}$.
3. The maximum burstiness allowed for a VC, $BI_{Max}$.
4. The extent that jitter is to be bounded on the switch.

The factors are the same that were required for determining the CBR priority levels, with the addition of $BI_{Max}$. The total Bandwidth-Burstiness range that must be covered by the various priority bands is given by the ratio $$\frac{BW_{IF} \cdot BI_{Max}}{BW_{Min}}.$$

As shown earlier, the ratio $BW_{High}/BW_{Low}$ gives the bandwidth range that is covered within one priority band. Since this is a geometric relationship, the number of priorities, P, required can be determined by the simple relationship:

$$\left(\frac{BW_{High}}{BW_{Low}}\right)^P = \frac{BW_{IF} \cdot BI_{Max}}{BW_{Min}}$$

If the ratio $BW_{High}/BW_{Low}$ is chosen to be exactly equal 2.0, then the 20 bandwidth ranges given in Table 4 for CBR traffic are used. However, Table 4 is modified by adding additional priorities to handle bursty traffic. This increases the low end of the priority scale, as the burstiness increases for low bandwidth VCs. Table 6 recreates Table 4, but extends it to handle various burstiness factors.

TABLE 6

Proposed Unified Priority Spectrum Bands with $\frac{BW_{High}}{BW_{Low}} = 2.0$

| Bandwidth Range | | Assigned Priority Level | | | | | | | | |
|---|---|---|---|---|---|---|---|---|---|---|
| $BW_{low}$ | $BW_{High}$ | BI = 1 (CBR) | BI ≦ 2 | BI ≦ 4 | BI ≦ 8 | BI ≦ 16 | BI ≦ 64 | BI ≦ 256 | BI ≦ 1024 | BI ≦ 4096 |
| >1.244 Gb/s | ≦2.488 Gb/s | 1 | 2 | 3 | 4 | 5 | 7 | 9 | 11 | 13 |
| >622 Mb/s | ≦1.244 Gb/s | 2 | 3 | 4 | 5 | 6 | 8 | 10 | 12 | 14 |
| >311 Mb/s | ≦622 Mb/s | 3 | 4 | 5 | 6 | 7 | 9 | 11 | 13 | 15 |
| >155.52 Mb/s | ≦311.04 Mb/s | 4 | 5 | 6 | 7 | 8 | 10 | 12 | 14 | 16 |
| >77.76 Mb/s | ≦155.52 Mb/s | 5 | 6 | 7 | 8 | 9 | 11 | 13 | 15 | 17 |
| >38.88 Mb/s | ≦77.76 Mb/s | 6 | 7 | 8 | 9 | 10 | 12 | 14 | 16 | 18 |
| >19.44 Mb/s | ≦38.88 Mb/s | 7 | 8 | 9 | 10 | 11 | 13 | 15 | 17 | 19 |
| >9.72 Mb/s | ≦19.44 Mb/s | 8 | 9 | 10 | 11 | 12 | 14 | 16 | 18 | 20 |
| >4.86 Mb/s | ≦9.72 Mb/s | 9 | 10 | 11 | 12 | 13 | 15 | 17 | 19 | 21 |

TABLE 6-continued

Proposed Unified Priority Spectrum Bands with $\frac{BW_{High}}{BW_{Low}} = 2.0$

| Bandwidth Range | | Assigned Priority Level | | | | | | | | |
|---|---|---|---|---|---|---|---|---|---|---|
| $BW_{low}$ | $BW_{High}$ | BI = 1 (CBR) | BI ≦ 2 | BI ≦ 4 | BI ≦ 8 | BI ≦ 16 | BI ≦ 64 | BI ≦ 256 | BI ≦ 1024 | BI ≦ 4096 |
| >2.43 Mb/s | ≦4.86 Mb/s | 10 | 11 | 12 | 13 | 14 | 16 | 18 | 20 | 22 |
| >1.215 Mb/s | ≦2.43 Mb/s | 11 | 12 | 13 | 14 | 15 | 17 | 19 | 21 | 23 |
| >607.5 Kb/s | ≦1215 Kb/s | 12 | 13 | 14 | 15 | 16 | 18 | 20 | 22 | 24 |
| >303.8 Kb/s | ≦607.5 Kb/s | 13 | 14 | 15 | 16 | 17 | 19 | 21 | 23 | 25 |
| >151.9 Kb/s | ≦303.8 Kb/s | 14 | 15 | 16 | 17 | 18 | 20 | 22 | 24 | 26 |
| >75.94 Kb/s | ≦151.9 Kb/s | 15 | 16 | 17 | 18 | 19 | 21 | 23 | 25 | 27 |
| >37.97 Kb/s | ≦75.94 Kb/s | 16 | 17 | 18 | 19 | 20 | 22 | 24 | 26 | 28 |
| >18.98 Kb/s | ≦37.97 Kb/s | 17 | 18 | 19 | 20 | 21 | 23 | 35 | 27 | 29 |
| >9.492 Kb/s | ≦18.98 Kb/s | 18 | 19 | 20 | 21 | 22 | 24 | 26 | 28 | 30 |
| >4.746 Kb/s | ≦9.492 Kb/s | 19 | 20 | 21 | 22 | 23 | 25 | 27 | 29 | 31 |
| >0† | ≦4.746 Kb/s | 20 | 21 | 22 | 23 | 24 | 26 | 28 | 30 | 32† |
| Bound for Relative Jitter (Interarrival Periods) | | ≦2 | ≦4 | ≦8 | ≦16 | ≦32 | ≦128 | ≦512 | ≦2048 | ≦8192 |

† Note: No Jitter Spec can be guaranteed for the lowest BW range.

Burstiness levels BI≦32, BI≦128, BI≦512, and BI≦2048 were omitted for table brevity; however they can be easily computed. Table 6 is not used to determine the priority level, it is shown only to visualize how the burstiness affects the priority level assigned to statistical calls. In practice, only the CBR column and the bandwidth ranges are required; however they are computed from priority 1 to priority 32. For statistical VCs, the ratio $BW_{Avg}$/BI is used and the result is looked up in the CBR column. Table 6 has 32 priority levels that will allow the fabric to handle traffic from CBR at 2.488 Gb/s to 4.7 Kb/s with BI=4096. A bound for the relative jitter can be absolutely guaranteed for any VC, CBR or statistical. The bound for the relative jitter on statistical VCs is determined only by its burstiness, not by its bandwidth, and the same relative jitter bound applies for all bandwidth ranges except for priority level=32. By specifying burstiness, maximum relative jitter can be guaranteed for an application and hardware designed appropriately.

Looser or tighter bounds for the relative jitter can be realized by using different numbers of priority levels. This is shown in Table 7. For comparison, $BW_{IF}$, and $BI_{Max}$ have been held constant at 2.488 Gb/s and 4096 respectively, such that 32 priority levels gives a $BW_{High}/BW_{Low}=2.0$, which matches the priority bands in Table 6. In Table 7, the number of priority levels is varied and corresponding bounds on the Relative Jitter are given.

TABLE 7

| Number of Unified Spectrum Priorities and Resulting Jitter | | | |
|---|---|---|---|
| Number of Priority Levels | $\frac{BW_{High}}{BW_{Low}}$ Ratio within 1 Band | Worst Case Relative Jitter (Interarrival Periods) | |
| | | CBR | Statistical |
| 1 | 4.3 E9 | 4.3 E9 | 4.3 E9*BI |
| 2 | 65536 | ≦65536 | ≦65536*BI |
| 3 | 1625.5 | ≦1625.5 | ≦1625.5*BI |
| 4 | 256.0 | ≦256.0 | ≦256*BI |
| 6 | 40.3 | ≦40.3 | ≦40.3*BI |
| 8 | 16.0 | ≦16.0 | ≦16*BI |
| 12 | 6.35 | ≦6.35 | ≦6.35*BI |
| 16 | 4.00 | ≦4.00 | ≦4*BI |
| 20 | 3.03 | ≦3.03 | ≦3.03*BI |
| 24 | 2.52 | ≦2.52 | ≦2.52*BI |
| 28 | 2.21 | ≦2.21 | ≦2.1.*BI |
| 32 | 2.00 | ≦2.00 | ≦2*BI |
| 48 | 1.58 | ≦1.58 | ≦1.58*BI |
| 64 | 1.41 | ≦1.41 | ≦1.41*BI |
| 96 | 1.26 | ≦1.26 | ≦1.26*BI |
| 128 | 1.19 | ≦1.19 | ≦1.19*BI |

TABLE 7-continued

| Number of Unified Spectrum Priorities and Resulting Jitter | | | |
|---|---|---|---|
| Number of Priority Levels | $\frac{BW_{High}}{BW_{Low}}$ Ratio within 1 Band | Worst Case Relative Jitter (Interarrival Periods) | |
| | | CBR | Statistical |
| ∞ | 1.00 | ≦1.00 | ≦BI |

It is to be understood that the above-described embodiments are merely illustrative of the principles of the invention and that many variations may be devised by those skilled in the art without departing from the spirit and scope of the invention. It is therefore intended that such variations be included within the scope of the claims.

I claim:

1. In a switching system serving a plurality of users, a method comprising receiving one or more parameters concerning the traffic expected on a call from a first one of said users to a second one of said users, and transmitting information to said second user during said call based on said expected traffic parameters and with less than a maximum jitter, wherein said transmitting comprises determining a priority based on said expected traffic parameters for said call, and transmitting said information to said second user during said call based on said priority and with less than said maximum jitter, wherein said call is a statistical call, said expected traffic parameters include an average bandwidth parameter, $BW_{Avg}$, and a burstiness index, BI, and said priority is determined based on $BW_{Avg}$ and BI.

2. A method in accordance with claim 1 wherein said priority is determined based on a ratio, $BW_{Avg}$/BI.

3. In a switching system serving a plurality of users, a method comprising receiving one or more parameters concerning the traffic expected on a call from a first one of said users to a second one of said users, and transmitting information to said second user during said call based on said expected traffic parameters and with less than a maximum jitter, wherein said transmitting comprises determining a priority based on said expected traffic parameters for said call, and transmitting said information to said second user during said call based on said priority and with less than said maximum jitter, wherein said determining comprises selecting said priority from a priority table where some statistical calls are given higher priority than some constant bit rate calls.

4. In a switching system serving a plurality of users, a method comprising receiving one or more parameters concerning the traffic expected on a call from a first one of said users to a second one of said users, and transmitting information to said second user during said call based on said expected traffic parameters and with less than a maximum jitter, wherein said transmitting comprises determining a priority based on said expected traffic parameters for said call, and transmitting said information to said second user during said call based on said priority and with less than said maximum jitter, wherein said determining comprises selecting said priority from a priority table having a number, P, of priority bands and having a maximum bandwidth, $BW_{High}$, and a minimum bandwidth, $BW_{Low}$, specified for each of said bands, wherein said call is a statistical call, said expected traffic parameters include an average bandwidth parameter, $BW_{Avg}$, and a burstiness index, BI, and said selecting comprises determining the one of said bands including $BW_{Avg}/BI$.

5. In a switching system serving a plurality of users, a method comprising receiving one or more parameters concerning the traffic expected on a call from a first one of said users to a second one of said users, and transmitting information to said second user during said call based on said expected traffic parameters and with less than a maximum jitter, wherein said transmitting comprises determining a priority based on said expected traffic parameters for said call, and transmitting said information to said second user during said call based on said priority and with less than said maximum jitter, wherein said determining comprises selecting said priority from a priority table having a number, P, of priority bands and having a maximum bandwidth, $BW_{High}$, and a minimum bandwidth, $BW_{Low}$, specified for each of said bands, wherein the ratio $BW_{High}/BW_{Low}$ is a constant for each of said bands.

6. A method in accordance with claim 5 wherein said maximum jitter is a worst case relative jitter.

7. A method in accordance with claim 6 wherein said call is a constant bit rate call comprising fixed length cells and said worst case relative jitter, in intercell arrival periods, is given by said constant ratio, $BW_{High}/BW_{Low}$.

8. A method in accordance with claim 6 wherein said call is a statistical call comprising fixed length cells, said expected traffic parameters include a burstiness index, BI, and said worst case relative jitter, in intercell arrival periods, is given by the product of BI and said constant ratio, $BW_{High}/BW_{Low}$.

9. A method in accordance with claim 6 wherein said priority table is used for constant bit rate calls only and may include one additional priority band below said P priority bands, and with P and $BW_{High}/BW_{Low}$ satisfying a relationship $(BW_{High}/BW_{Low})^P = BW_{IF}/BW_{Min}$, where $BW_{IF}$ and $BW_{Min}$ are the maximum and minimum bandwidths between each of said users and said switching system.

10. A method in accordance with claim 6 wherein said priority table is used for both constant bit rate calls and statistical calls and may include one additional priority band below said P priority bands, and with P and $BW_{High}/BW_{Low}$ satisfying a relationship $(BW_{High}/BW_{Low})^P = BW_{IF}*BI_{Max}/BW_{Min}$, where $BW_{IF}$ and $BW_{Min}$ are the maximum and minimum bandwidths and $BI_{Max}$ is the maximum burstiness between each of said users and said switching system.

11. In a switching system serving a plurality of users, a method comprising receiving one or more parameters concerning the traffic expected on a call from said first user to a second one of said users, determining a priority based on said expected traffic parameters, and transmitting information to said second user during said call based on said priority, wherein said call is a statistical call, said expected traffic parameters include an average bandwidth parameter, $BW_{Avg}$, and a burstiness index, BI, and said priority is determined based on $BW_{Avg}$ and BI.

12. A method in accordance with claim 11 wherein said priority is determined based on a ratio, $BW_{Avg}/BI$.

13. In a switching system serving a plurality of users, a method comprising receiving one or more parameters concerning the traffic expected on a call from said first user to a second one of said users, determining a priority based on said expected traffic parameters, and transmitting information to said second user during said call based on said priority, wherein said determining comprises selecting said priority from a priority table where some statistical calls are given higher priority than some constant bit rate calls.

14. A switching system serving a plurality of users comprising means for receiving one or more parameters concerning the traffic expected on a call from a first one of said users to a second one of said users, and means for transmitting information to said second user during said call based on said expected traffic parameters and with less than a maximum jitter, wherein said transmitting means comprises means for determining a priority based on said expected traffic parameters for said call, and means for transmitting said information to said second user during said call based on said priority and with less than said maximum jitter, wherein said determining means comprises means for selecting said priority from a priority table where some statistical calls are given higher priority than some constant bit rate calls.

* * * * *